United States Patent Office 3,326,349
Patented June 20, 1967

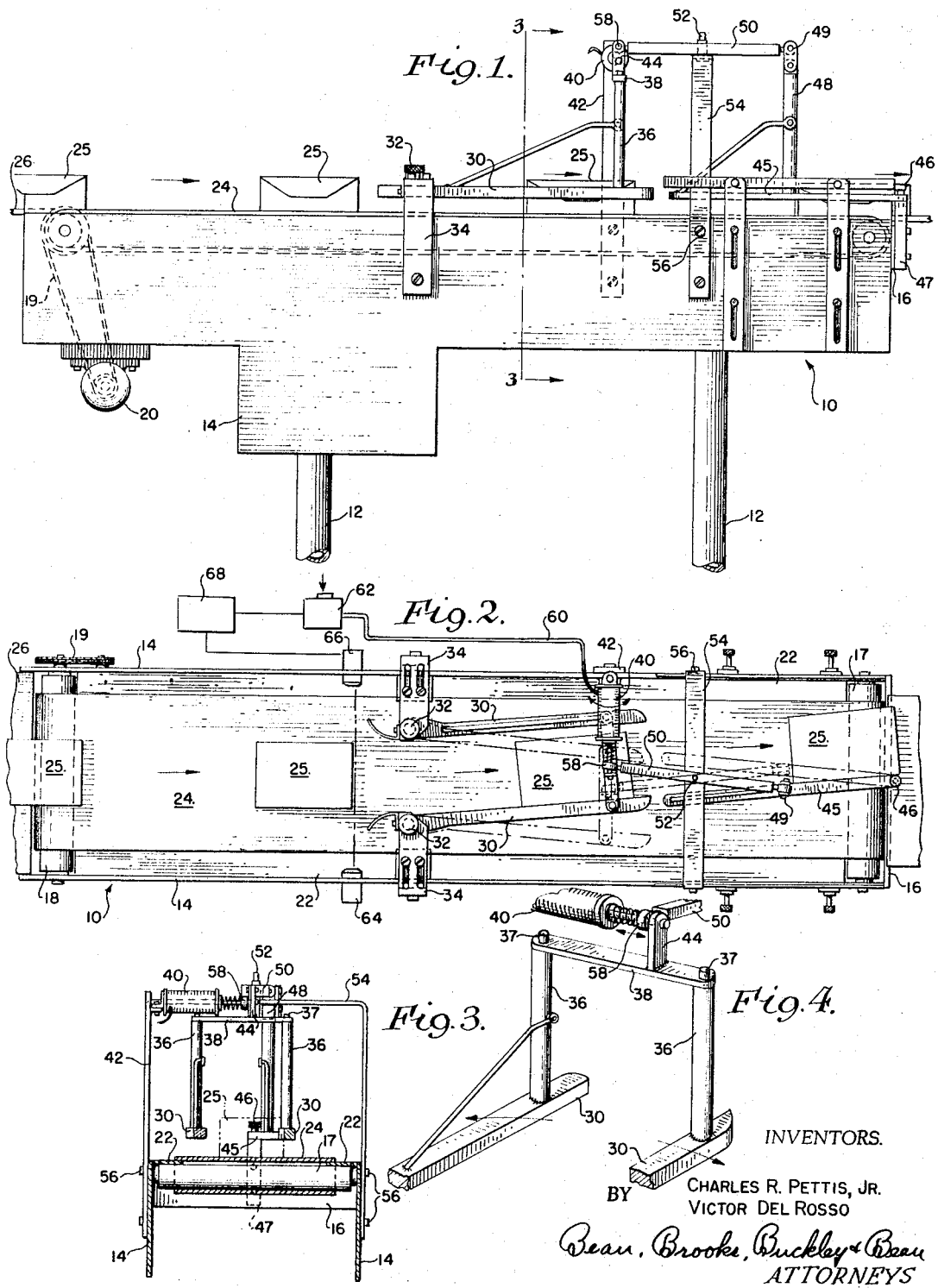

3,326,349
PARALLEL GATE SEGREGATOR
Charles R. Pettis and Victor Del Rosso, both of Ithaca, N.Y., assignors to Hi-Speed Checkweigher Co., Inc., Ithaca, N.Y.
Filed June 8, 1966, Ser. No. 556,169
4 Claims. (Cl. 198—31)

This invention relates to mechanisms for receiving a line of moving articles and selectively directing them into different discharge paths. More particularly the invention provides improved means for use in an article train conveying system whereby a single row of articles moving in common alignment may be separated into a plurality of rows such as for conveyance to multiple pocket carton filling equipment or the like; or alternatively, whereby "reject" articles may be diverted from a delivery line, or the like. The invention has particular utility for example in the automatic packaging and carton filling fields; and also in the check-weighing field; or wherever it is desired to divide a single row of moving articles into a plurality of rows, or wherever it is required to reject underweight or otherwise sub-quality articles from a delivery line. The mechanism may also be employed for example to accommodate the system to segregate differently sized packages, or the like.

Swing-gate "diverter" type mechanisms have been previously developed for the above stated purposes, such as are disclosed for example in U.S. Patent 2,987,251; but effective applications thereof have been limited by reason of the requisite lengths of the gate arms in order to produce the required lateral displacements. In such systems it is axiomatic that overall production rate is a function of conveyor speed and distance between packages. However, the gate "arm" length dictates the distance needed between the packages as they travel through the diverter apparatus; and prior art arrangements for such purposes have therefore been necessarily limited with respect to their capabilities in this respect.

It is a primary object of the present invention to provide an improved swing-gate type segregator or diverter mechanism as aforesaid, wherein the requisite "effective" gate arm length may be realized through use of a plurality of novelly cooperative gate arms; whereby a much closer article-to-article feed arrangement may be employed, thereby increasing the production rate for any given conveyor speed.

Another object is to provide an improved device as aforesaid which accomplishes the above stated object while subjecting the diverted articles to only "normal" or gradual directional change accelerations.

Other objects and advantages of the invention will appear from the following specification and the accompanying drawing wherein:

FIG. 1 is a side elevation of a diverter mechanism embodying the present invention;

FIG. 2 is a top plan view thereof, showing schematically a typical control system;

FIG. 3 is a vertical sectional view taken as suggested by line 3—3 of FIG. 1; and FIG. 4 is an enlarged scale fragmentary perspective view of a portion of the mechanism.

As shown in the drawing herewith, the device of the invention may for convenience by carried by means of a table 10 which comprises vertical legs 12 and side plates 14. The side plates may be held in spaced relation as by means of cross bars 16, and rotatably support conveyor rollers 17, 18. The roller 18 is shown as being power-driven by means of a chain 19 and motor 20. Apron plates 22 are preferably provided along with each side of the table construction to extend under the corresponding side edges of the top strand of an endless conveyor belt as indicated at 24. Thus it will be appreciated that operation of the motor 20 will drive the conveyor belt 24 to carry packages or other like articles as indicated at 25, from the intake portion of the machine at the left hand side of FIGS. 1, 2 of the drawing, to the discharge end of the machine at the right hand side of the drawing.

The conveyor device is shown as being of the single endless belt type, although it will be understood that the conveyor may be of any other type. At the intake end the articles are fed to the machine by any suitable means (such as an apron 26) onto the belt 24 at approximately the longitudinal center line thereof. The diverter mechanism of the invention is disposed to straddle the belt so as to receive the transported articles 25 as best shown at FIG. 2. The diverter mechanism comprises a first or primary swing-gate device which includes a pair of parallel disposed gate arms 30—30 each pivotally mounted as indicated at 32, 32 to brackets 34, 34 extending from opposite sides of the table structure. Each gate arm carries adjacent its free end an upstanding post 36, and at their upper ends the posts 36, 36 are pivotally connected as indicated at 37, 37 (FIG. 4) to a cross beam 38. Thus, it will be appreciated that the gate arms 30, 30 are at all times maintained in parallel extending relation while at the same time being free to oscillate sidewise as viewed in FIG. 2, upon the pivots 32, 32.

The gate arms 30, 30 are mounted at such vertical heights as to suitably slide-contact the sides of the articles being transported by the belt, for laterally guiding and/or diverting the articles relative to the desired discharge paths. The gate arm pivot devices at 32—32 are vertically adjustable to suit articles of different heights. To shift the gate arms 30, 30 to cause the mechanism to divert articles to either side edge of the belt 24, a pneumatic piston-cylinder unit as indicated at 40 is shown by way of example as being mounted on an upstanding bracket 42 and disposed to engage at its piston end portion a horn 44 extending from the crossbeam 38. Hence, it will be understood that reciprocal motions of the cylinder piston will cause the gate arms 30, 30 to swing alternately between the solid line and broken line positions thereof as shown in FIG. 2. Thus, controlled operations of the cylinder 40 will shift the gate bars 30, 30 to divert the articles being processed away from the conveyor center line onto either the left or right hand edges of the belt as they approach the discharge end of the conveyor.

It is a particular feature of the present invention that the primary gate arms 30, 30 are functionally supplemented by means of an auxiliary gate which as shown herein may be provided in the form of a single guide bar 45 which is pivotably mounted at its far end, as indicated at 46, upon a bracket 47 carried by the front end structure of the table. The pivotal connection device 46 is disposed at the conveyor center line, and intermediately of its length the gate bar 45 carries an upstanding post 48 which pivotably connects at its upper end as indicated at 49 to one end of a rocker arm 50. The rocker arm is pivotably mounted as indicated at 52 upon an inverted U-shaped bracket 54, the opposite leg portions thereof being fixed as indicated at 56 to the table structure.

At its other end the rocker bar 50 pivotably connects as indicated at 58 to the main gate position control horn 44. Thus it will be seen that the gate bars 30, 30 and their upstanding posts 36, 36 straddle the path of articles being conveyed therethrough regardless of to which path the gate bars are set (as shown alternatively by the solid and broken lines illustrations thereof at FIG. 2). Also it will be seen that when the main gate bars are set as illustrated by their solid line showings in FIG. 2, the rocker arm 50 will have automatically operated to shift the auxiliary gate bar 45 on its pivot 46 so as to now stand in directional alignment with the right hand gate bar 30.

Thus, the bar 45 takes over and continues the sidewise camming of the article which was initiated by the right hand main gate bar 30 when the article first entered the diverter, thereby completing the displacing of the article to the furthermost left hand side edge portion of the conveyor.

On the other hand, reverse operation of the piston-cylinder unit 40 will cause the main gate to shift to the right and toward the broken line position thereof as shown in FIG. 2. At this same time the bar 50 will be rocked about its pivot 52, thereby swinging the auxiliary gate bar to move to its broken line position. Hence, when the mechanism is so set an article entering the primary gate device is cammed toward the right, initially by the gate bar 30 at the left hand side of the mechanism, and then later by the auxiliary bar 45, until it is properly disposed on the right hand edge of the conveyor belt as it emerges at the discharge end of the apparatus. Note that after an article leaves the primary diverter gateway but is still engaged by the auxiliary bar 45, if the control then signals for a mechanism shift so that the next succeeding article will be shunted onto the other edge of the conveyor belt, the main gate will immediately shift as explained hereinabove while the interconnecting linkage "kicks" the auxiliary bar upon its pivot, thereby shovelling the leading article to continue to move onto the furthermost edge of the belt and in line with its intended discharge path.

Thus it will now be understood that by virtue of the present invention the operative lengths of the bars 30, 30 of the primary gate system are in effect substantially extended by means of the cooperative auxiliary bar 45; the degree of such extension being of course a function of the relative lengths of the main and auxiliary bars. For example, as shown in FIG. 2, the diverter mechanism is operating to present to the engaged articles a slide-cam length equal to the sum of the lengths of the primary and auxiliary bars. Similarly, if the apparatus is actuated so as to shift the diverting mechanism to the right (as to the broken line positions thereof in FIG. 2) the gate bars will then be set to impose against the article being transported a slide-cam bar cooperative arrangement of equal overall length.

It is this feature of the present invention that adapts it to accommodate a substantially increased rate of article transport and segregation operation in connection with only a single conveyor belt of minimum width. For example it will be clearly apparent by reference to FIG. 2 that if a single diverter gate bar device were employed (as in the case of the prior art) to laterally displace the articles being transported from the center of the conveyor belt to either the left hand or right hand side thereof, the gate bars would of necessity be of lengths equal to the sum of the length of one of the bars 30 and of the bar 45 of the drawing herewith. It follows that in such event the entire diverter gate mechanism would be "tied-up" throughout the entire time of passage of an article from the point of its initial entrance into the gate mechanism until it emerged at the discharge end of the conveyor 24.

As distinguished from such arrangements which typify the prior art, the present invention provides a mechanism whereby, as soon as an article has passed the primary gate bars, the primary gate mechanism may be shifted to initiate a succeeding, oppositely directed, article guidance maneuver, without interfering with the continued camming operation of the auxiliary gate bar on the leading article. Hence, by virtue of the present invention, the articles being processed may be fed to the machine in substantially closer spaced relation, and a substantially higher overall production rate is thereby attainable at the same conveyor belt speed. These desirable results are attained without the necessity of increasing the angle of lateral diversion, which obviously is also a critical parameter and enters into any consideration of the overall capabilities and efficiencies of such apparatuses.

It will be of course be understood that operation of the gate shift unit may be controlled in any preferred manner. By way of example the cylinder 40 is shown to be powered by conduits 60 (FIG. 2) through which compressed air flow is controlled by means of a solenoid valve 62. The valve 62 may in turn be controlled in any desired manner; such as manually or automatically as in response to a mechanically or electrically synchronized control mechanism. For example as shown in FIG. 2, an "electric-eye" detection mechanism comprising a light source 64 and a receiver 66 may be positioned at opposite sides of the conveyor belt to transmit a signal in response to movements of articles across the light beam, via an amplifier as indicated at 68, and thence to the electrical control circuit of the valve 62. Thus, for example, the machine may be employed to separate a single line of moving articles into two lines; the diverter and control mechanism therefor being set so as to deflect alternate articles into the right and left hand discharge paths, respectively.

Or, the mechanism may be arranged so that the solenoid valve for example receives a signal from a checkweigher, for automatically rejecting low-weight packages or the like from the main delivery line. In lieu of the "electric-eye" control arrangement any other type article scanning and stepping circuit mechanism may be employed, such as for dividing a single feed column of articles into a multiple line discharge. Or, a cam-operated switch may be employed; the cam motion being synchronized with the conveyor motion and thereby indirectly synchronized with a package filler and conveyor indexing mechanism or the like as shown by way of example in U.S. Patent 2,907,443. In any case, the auxiliary gate bar is mechanically synchronized with the primary gate adjustment motions by means of the interconnecting linkage, and operates automatically to provide the improvement features set forth and explained hereinabove.

It will be of course be appreciated that by virtue of the invention, as the articles traveling on the conveyor encounter the first cam arm portion of the mechanism (when set in laterally inclined and article diverting position) they are thereby initially cammed only partially toward the intended new path and for only so long as they are engaged by the relatively short length of the first arm. They are thereupon further escorted toward the intended offset path by the second or auxiliary cam arm while the first cam arm is then free to be moved if desired to initiate a switch of direction for succeeding article travel. By reason of this arrangement the rate at which directional switchings may be attained is substantially increased.

It is to be understood that whereas the drawing and specification herewith illustrate and describe the invention only as being embodied in a mechanism having a pair of parallel "first" cam arms, the advantages of the invention may be attained in a device employing only a single "first" cam arm such as would be useful in a machine operating to provide for occasional alternative diversions of articles from a normal travel path on the conveyor to a laterally offset path thereon. Therefore, although only one physical embodiment of the invention has been shown by way of example herein, it will be understood that various changes my be made therein without departing from the spirit of the invention or the scope of the following claims.

We claim:

1. A mechanism for use in combination with a conveyor of articles initially carried thereon in single file arrangement, to selectively divert said articles to a laterally offset path of travel, said mechanism comprising,
   a first pivot bracket means,
   a first cam arm device extending generally in the direction of conveyor movement and pivotally mounted on said bracket means so that its leading end portion is thereby positionally disposed alongside the normal path of travel of said single file moving articles, a second pivot bracket device, an auxiliary cam arm disposed downstream in the direction of conveyor travel relative to said first cam arm device and pivotally mounted upon said second pivot bracket device, a third pivot bracket device, and a rocker arm pivotally mounted on said third bracket device above the path of article travel and pivotally connected at one of its ends to said first cam arm device and at its other end to said auxiliary cam arm, an actuator operably connected to said mechanism for swinging said cam arm devices laterally in opposite directions relative to the direction of conveyor travel and thereby operable to force the engaged articles to slide sidewise on said conveyor and to be thereby diverted to a laterally offset discharge path, the parts being so dimensioned and relatively arranged that when said actuator causes said first cam arm device to swing laterally of the conveyor direction of travel said rocker arm operates to shift said auxiliary cam arm into directional alignment with the camming arm portion of said first cam arm device to continue the sidewise sliding diversion of the engaged articles initiated by said first cam arm device.

2. A mechanism as set forth in claim 1 wherein said first cam arm device comprises a pair of cam arms disposed in parallel spaced relation having their leading end portions respectively pivotally mounted on said first bracket means at opposite sides of the initial path of travel of said articles.

3. A mechanism as set forth in claim 2 wherein said pivot bracket devices span said conveyor in overhead spaced relation therefrom to clear the paths of article travel.

4. A mechanism as set forth in claim 3 wherein said actuator is operably coupled to said first cam arm device.

References Cited
UNITED STATES PATENTS

| | | | |
|---|---|---|---|
| 1,926,593 | 9/1933 | Mayo | 198—31 |
| 2,451,104 | 10/1948 | Lowe | 198—31 X |

EVON C. BLUNK, *Primary Examiner.*

R. J. HICKEY, *Assistant Examiner.*